United States Patent [19]

Heller

[11] 4,172,712
[45] Oct. 30, 1979

[54] GLASS BATCH WETTING AND MIXING APPARATUS

[75] Inventor: Arthur D. Heller, Horseheads, N.Y.

[73] Assignee: Dart Industries Inc., Los Angeles, Calif.

[21] Appl. No.: 808,049

[22] Filed: Jun. 20, 1977

Related U.S. Application Data

[63] Continuation-in-part of Ser. No. 687,958, May 19, 1976, abandoned.

[51] Int. Cl.² .............................................. C03B 3/00
[52] U.S. Cl. ......................................... 65/161; 65/27; 65/335; 106/DIG. 8; 366/301
[58] Field of Search .................. 65/161, 160, 335, 27; 106/DIG. 8; 366/301, 297, 66; 259/6

[56] References Cited

U.S. PATENT DOCUMENTS

| | | | |
|---|---|---|---|
| 594,672 | 11/1897 | Arnold | 366/301 X |
| 1,790,115 | 1/1931 | Sells | 366/297 X |
| 2,917,395 | 12/1959 | Csanyi | 366/301 X |
| 3,705,792 | 12/1972 | Peters | 65/161 X |
| 3,725,022 | 4/1973 | Mills | 65/335 X |
| 3,765,854 | 10/1973 | Kozlowski | 65/335 X |
| 3,879,150 | 4/1975 | Brown et al. | 366/301 X |
| 3,897,235 | 7/1975 | Wilson | 65/161 X |

Primary Examiner—S. Leon Bashore
Assistant Examiner—Frank W. Miga

[57] ABSTRACT

An apparatus for automatically wetting and mixing glass batch immediately prior to its introduction into a glass melting furnace. This apparatus is an axillary extension of a typical glass furnace charger hopper and provides for complete glass batch wetting and mixing immediately adjacent the glass melting furnace so as to minimize the possibility of batch "dryout" and similarly thereby minimize atmospheric dust pollution and other associated problems. Mixing action is continuous and the apparatus is arranged such that a fluid, normally water, is added to and mixed with the batch responsive to charger operation. The apparatus is structured in such fashion to emphasize mixing rather than material conveyance, thus reducing wear upon the structural elements while at the same time providing complete and uniform wetting of the batch within same.

12 Claims, 19 Drawing Figures

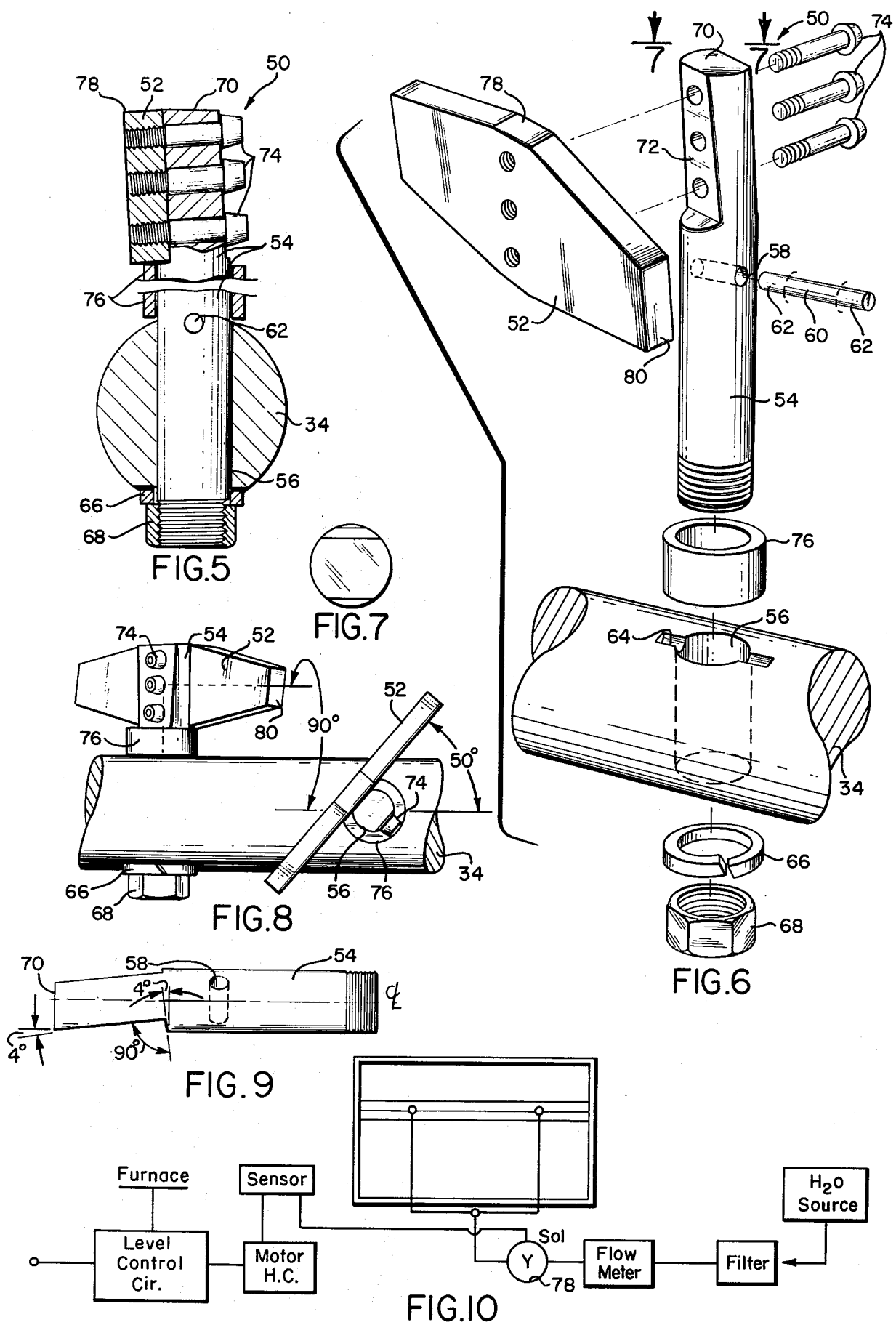

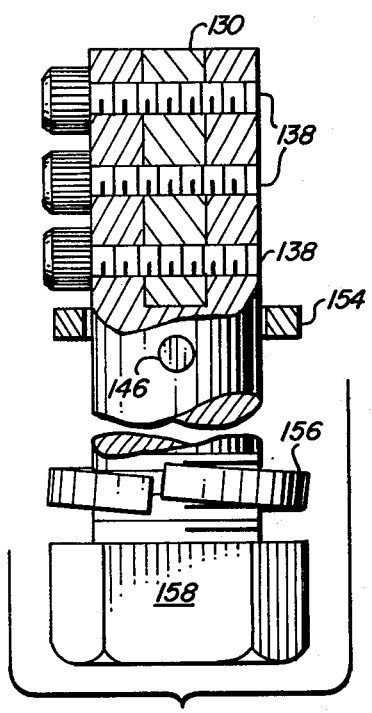
FIG. 15
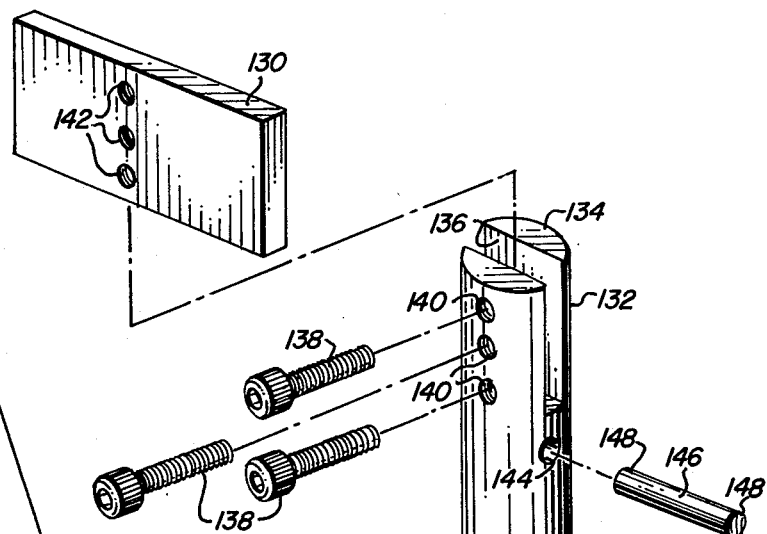
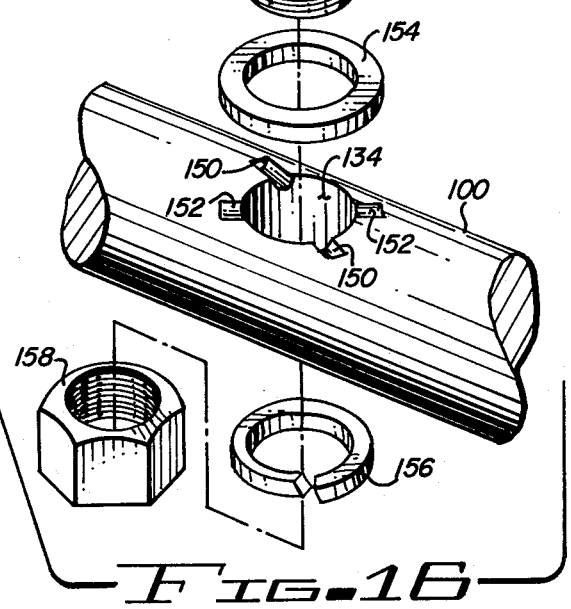
FIG. 16
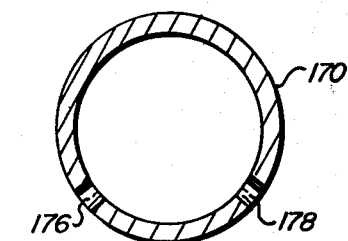
FIG. 17
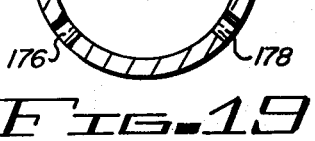
FIG. 19
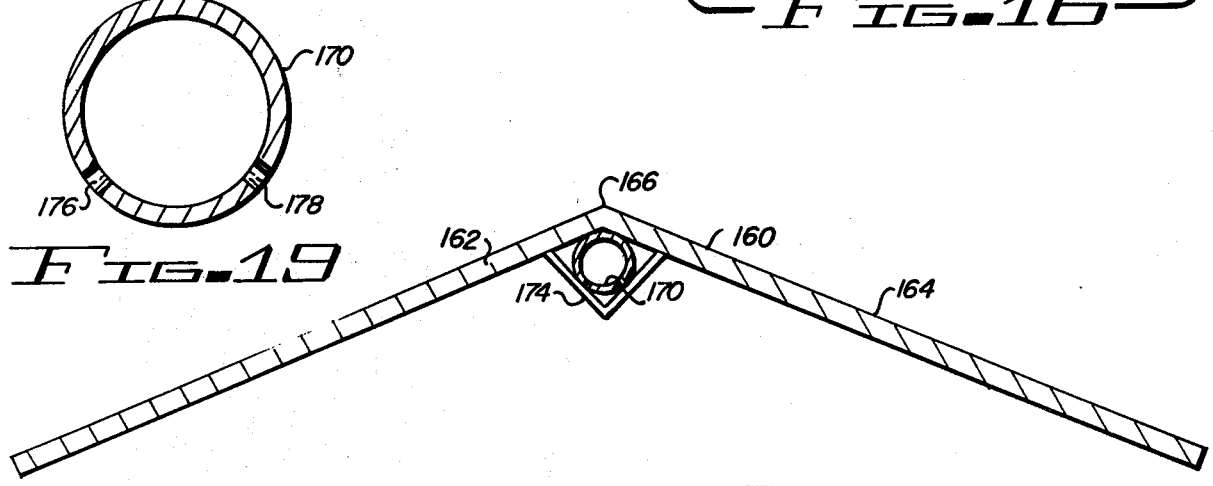
FIG. 18

GLASS BATCH WETTING AND MIXING APPARATUS

This application is a continuation-in-part application of the instant inventor's prior filed co-pending application, Ser. No. 687,958, Filed May 19, 1976, Entitled 'Glass Batch Wetting and Mixing Apparatus' now abandoned.

This invention relates to the manufacture of glass and more particularly to an improvement in the means for charging particulate materials to a glass melting furnace.

Glass batch in its usual form is a mixture of finely divided solids which are thoroughly mixed and delivered to a refractory furnace by a system of hoppers, gravity flow chutes and other positive displacement conveyors. Since the batch is a finely divided material, severe dusting conditions are commonly encountered when the batch is exposed to the high velocity hot gases of the melting furnace. Additionally, the glass batch is extremely abrasive and will erode even the hardest of materials in a relatively short time where it frictionally contacts the moving parts of conventional positive displacement conveyance means such as screw conveyors, augers or the like.

Numerous attempts have been made to reduce furnace dusting by wetting the glass batch prior to its delivery to the glass melting furnace. Such technique, however, in and of itself creates additional problems particularly as they relate to caking within the various conveyors and other transportation means which commonly form a part of the batch handling system. Process and apparatus improvements intended to aleviate this caking problem have included batch cooling and conveyor mixing. It should, however, be appreciated that where batch temperature control must be achieved, the various controllers and heat transfer equipment itself will present economic considerations that make its use prohibitive. Likewise, in those instances where the batch is being actively conveyed by the mixer apparatus, undue equipment wear will be encountered due to the abrasive characteristics of the batch.

Accordingly, as a principle objective the invention seeks to provide a means for effectively wetting glass batch and maintaining the wetted level thereof to such an extent that dusting within the glass furnace will be effectively minimized.

Furthermore, it is an objective to, in such apparatus, thoroughly mix the batch while at the same time minimizing the degree of wear that such mixing equipment will be subjected to during its operation.

This invention, therefore, provides a structural arrangement wherein the typical hopper of a glass furnace charger is enlarged to such an extent that it will appropriately accommodate a mixing arrangement. The principle mode of movement through the mixer, therefore, continues to be that which is common to the glass furnace charger, i.e. gravity. Mixing action within the hopper is achieved by means of two rotating shafts having uniquely structured agitating means positioned therearound. These rotary agitators tend not only to mix the batch, but to move same toward the center of the hopper during the mixing action.

Furthermore, responsive to the active feeding action of the charger itself, suitable circuitry is designed to provide a uniform and constant flow of fluid to spray heads positioned above the hopper. Accordingly, as new batch enters the inlet opening of the hopper, such is thoroughly wetted to a degree that will assure a desired wetness level as same exits the charger into the glass furnace.

It should be noted that this system employs gravity feed as its principle mode of batch movement and that the addition of fluid to batch is accomplished at a point within that system which is immediately adjacent to the furnace itself.

This construction, therefore, minimizes the likelihood of caking becoming a problem and similarly provides for thorough mixing with minimum erosive tendencies. Other distinct advantages of the invention will become apparent upon reference to the appended specification, claims and drawings wherein:

FIG. 5 is a cross-sectional view of a typical agitation element forming a part of this mixing apparatus and wherein such has been broken and rotated to fully show same;

FIG. 6 is an exploded perspective view of a typical one of the agitating elements positioned on the rotating shafts of the mixing apparatus;

FIG. 7 is a top plan view of an agitator pin element of this apparatus;

FIG. 8 is a partial assembly view of a mixing shaft illustrating the respective positioning of agitator elements thereon;

FIG. 9 is an elevational view of a typical one of the agitating pin elements;

FIG. 10 is a block diagram illustrating the elements essential to the delivery of fluid to the glass batch in the mixing apparatus.

FIG. 15 is a side view of an alternate typical agitation element forming a part of the mixing apparatus of FIG. 12 and wherein such has been broken to fully show same;

FIG. 16 is an exploded perspective view of a typical one of the agitating elements positioned on the rotating shafts of the mixing apparatus as seen in FIG. 12;

FIG. 17 is a partial assembly view of a mixing shaft in accordance with the embodiment of FIG. 12 and illustrating the respective positioning of agitator elements thereon;

FIG. 18 is a vertical sectional view taken along the line 18–18 of FIG. 13; and

FIG. 19 is an enlarged view of the fluid delivery means as seen in FIG. 18.

Figure 1:
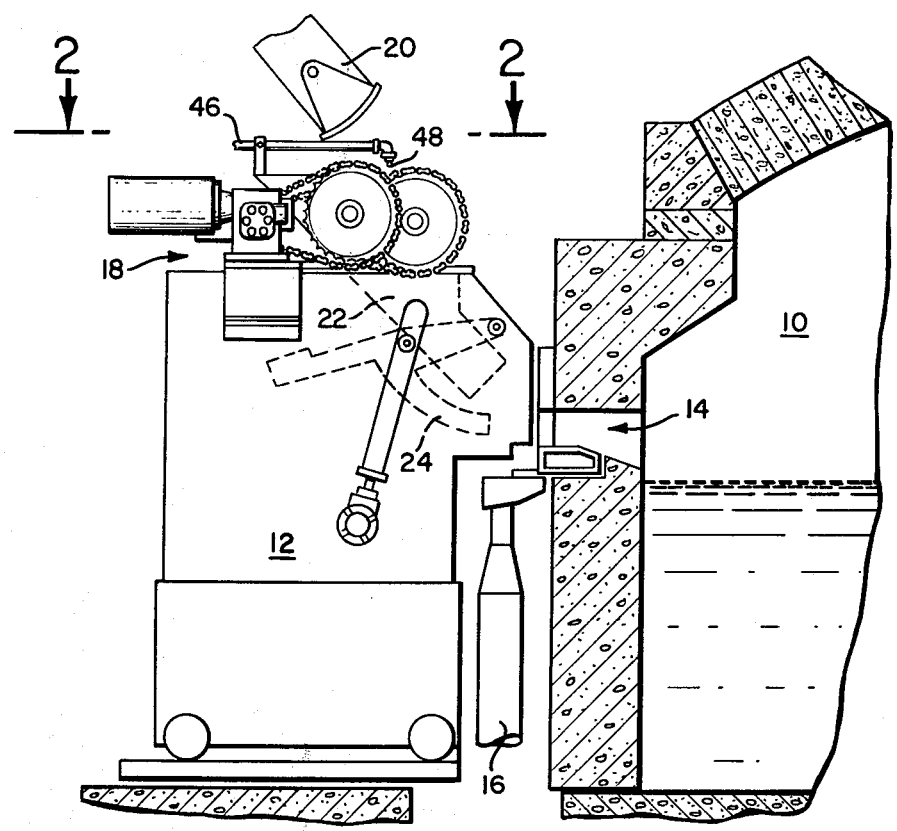
FIG. 1 is a side elevational view partially in cross section showing a typical glass melting furnace and furnace charger incorporating the mixing apparatus of this invention.

Referring now to the drawings in which like numerals have been used to designate like components, FIG. 1 shows the relationship between this newly conceived apparatus and a typical glass melting furnace 10. Adjunct to the melting furnace 10 is the glass furnace charger 12 which is moveably mounted for easy positioning at the furnace opening 14. Also provided is an air duct 16 that conducts cooling air to both the glass furnace opening and the furnace charger. Positioned atop the glass furnace charger 12 is the glass batch mixing apparatus 18 and positioned immediately adjacent such mixing apparatus is the batch delivery means 20. As is apparent, glass batch is delivered to the mixing apparatus 18 through the delivery means 20 and subsequent to being wetted and mixed, exits into the furnace charger in hopper 22. Thereafter, the batch is intermitently delivered to the furnace opening 14 by the pusher element or feeding means 24. In effect, therefore, the mixing appartus 18 becomes an extension of the charger hopper 22 and as has been typical in the past, glass batch that is delivered to the hopper moves therethrough basically as a result of gravity flow.

Figure 2:
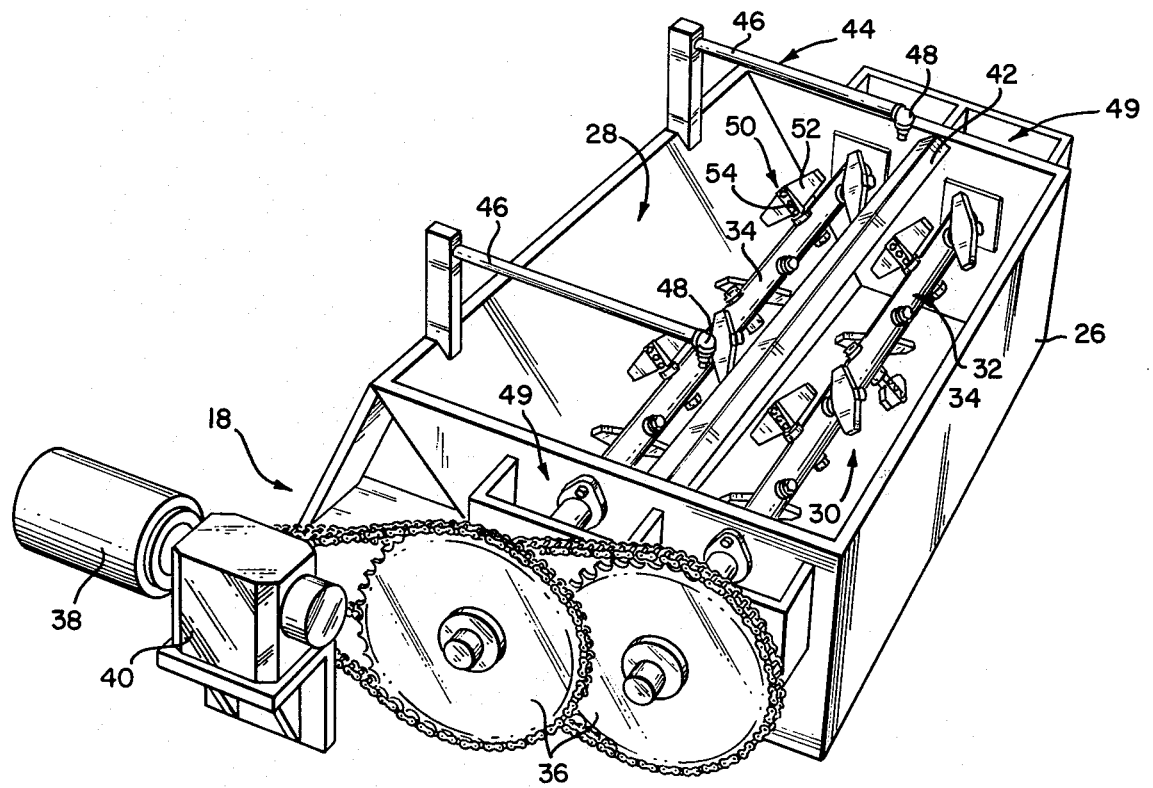
FIG. 2 is a top perspective view showing the mixing apparatus per se.
Figure 3:
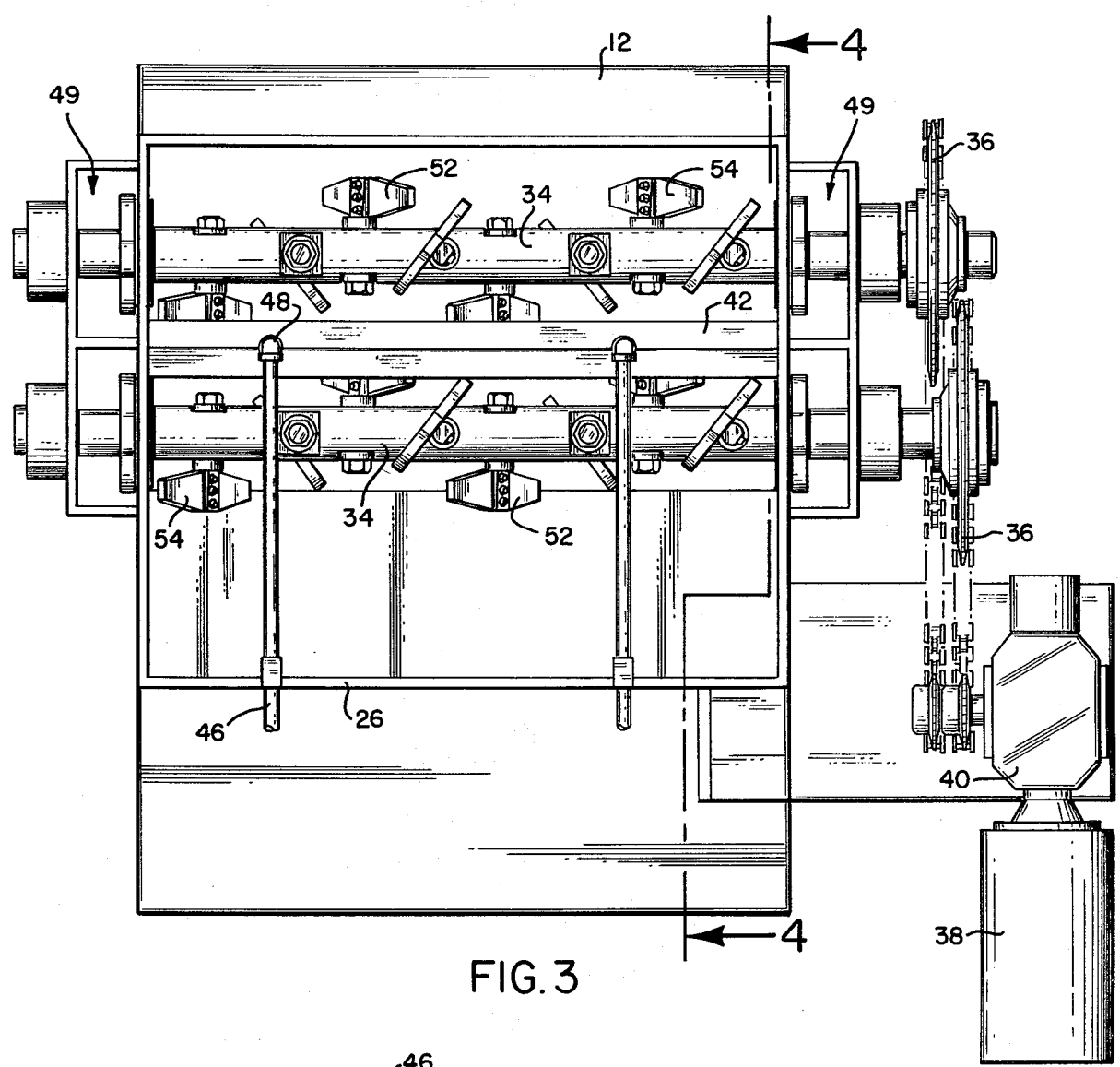
FIG. 3 is a top plan view of the furnace charger and mixing apparatus.
Figure 4:
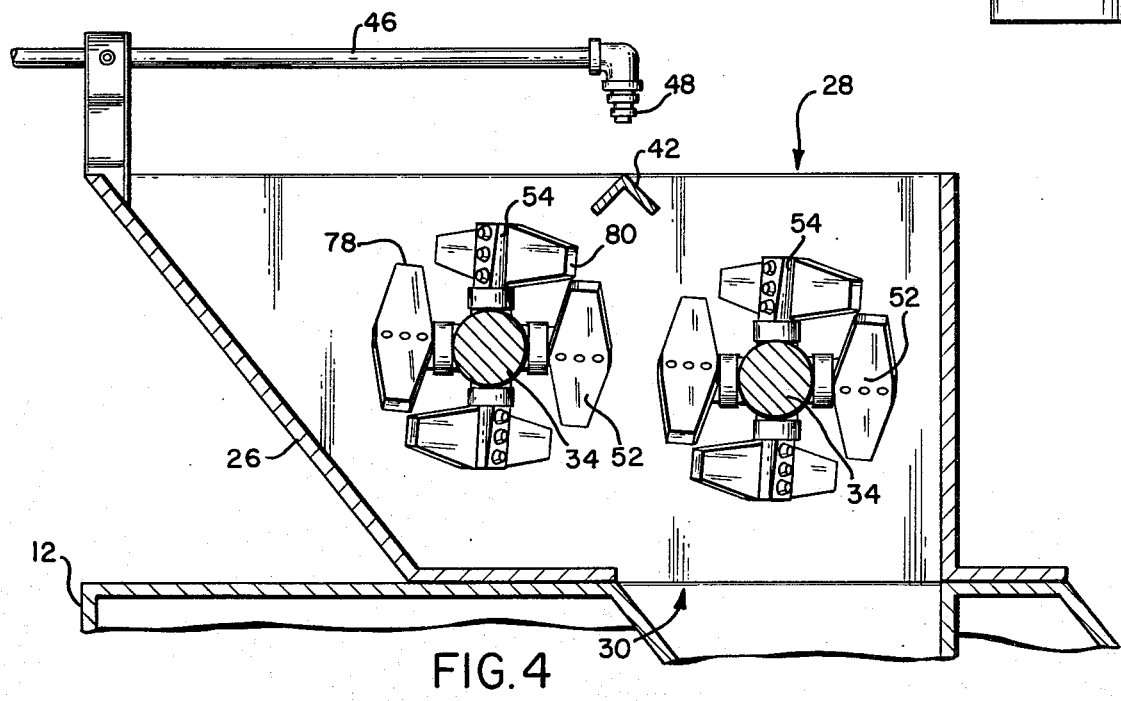
FIG. 4 is a cross-sectional view taken along line 4—4 of FIG. 3.

The glass batch mixing apparatus 18 as can best be seen in FIGS. 2, 3 and 4 is composed of a receptacle 26 having a top inlet opening 28 and a bottom outlet opening 30 which will accommodate the gravity flow of glass batch through the receptacle 26. Also, not that the wall construction of the receptacle 26 is designed such that the bottom outlet opening 30 is of approximately the same size as the inlet opening of the furnace charger hopper 22. Accordingly, upon attachment of the mixing apparatus 18 to the furnace charger 12, these respective openings 22, 30 are aligned and the mixing apparatus thereby effectively becomes an enlargement of the basic hopper construction 22 of furnace charger 12. The receptacle 26 has positioned therein a rotatably mounted mixing means 32 which is comprised of two main rotatable shafts 34 each being driven through a suitable chain and sprocket assembly 36, and gear reducer 40 by motor 38. Also positioned within the receptacle 26 is a deflection baffle 42 which is adapted to redirect glass batch as it is delivered from delivery means 20 to a position above each of the mixing means 32. It is preferred that the sprocket assemblies 36 be of the type that incorporates a slip clutch arrangement. Such arrangement will minimize the possibility of damaging the various driving means 36, 38, 40 in the event of the mixer jamming or plugging.

Similarly, there is affixed to the receptacle 26 a fluid delivery system 44 comprised of fluid conduits 46 and delivery means 48, the latter being typical full cone fluid spray nozzles. These nozzles 48 are similarly positioned above the deflection baffle 42 and adjacent to the batch delivery means 20 so that as batch is delivered therefrom it may be fully wetted in the preparation for mixing and passage through the receptacle 26. Full cone nozzles 48, as opposed to hollow cone or flat spray nozzles, are preferred because such tend to provide the most uniform wetness to the surface of the batch upon its initially entering the mixer 18.

The driving means 36, 38, 40 is adapted for constant operation so that the rotatably mounted mixing means 32 within the receptacle 26 is in constant motion thereby agitating the glass batch within that receptacle even in the absence of batch movement through same. Accordingly, the particulate materials in the noted receptacle are not afforded any opportunity to cake or otherwise solidify because of their wetted condition.

The speed of rotation will, of course, be determined by the batch consistency, its speed of movement through the receptacle and the degree of wetness of the batch itself. Accordingly, such will be subject to experimentation and adjustment based upon operating conditions that may be encountered in any particular situation.

Although not shown in the drawings, it may be desirable or necessary to also cool the various driving means 36, 38, 40 and the bearing mounts 49 of the mixing apparatus 18. In such event it is appropriate to provide additional ducting and shields for the various apparatus elements. A ready source of cooling air may, of course, be found in existing tank wind line or duct 16.

Each of the rotatably mounted mixing means 32 incorporates upon shaft 34, agitating means 50 but seen in FIGS. 5 and 6 which are comprised of radially protruding paddle members 52 affixed to pins 54. Each of the shafts 34 are suitably bored as at 56 to accept the pins 54. These bore holes 56 are positioned along and around the shafts in a symmetrical relationship that provides for a slight overlap of the area swept by paddle members 52 during shaft rotation and at approximately a 90 degree offset with respect to each adjacent bore hole 56.

The agitating means 50 is affixed to the shafts 34 as is there shown. The particular means and method for mounting same need not take the exact constructural form here disclosed, but such has found to be an effective and relatively inexpensive arrangement that is highly compatible with the end results desired. Note in particular that each of the pins 54 includes a drill hole 58 into which the shear pin 60 is pressed in a fashion that leaves extended end portions 62 protruding from each side of the pin 54. These extended pin portions 62 are adapted for receipt within the bore hole opening 56. Accordingly, the pin 60 provides for the alignment of pin 54 with respect to the shaft 34 and similarly position same in its transverse relationship with respect to shaft 34. The pin 54 can thereafter be firmly and securely affixed to shaft 34 by means of the lock washer 66 and nut assembly 68.

The outer most end 70 of each pin 54 incorporates an inwardly angled recess 72. Such recess 72 is adapted to support the center part of the paddle member 52 in such fashion that it is slightly canted with respect to the pin axis. As can be appreciated, each such paddle 52 is firmly affixed to the pin 54 by a plurality of stud bolts 74. It should, however, also be appreciated that the means to affix these particular elements, one to another, may take any suitable form and is not restricted to that disclosed here. The recess 72 is canted at between two and five degrees and preferably at approximately four degrees to effect the blade incantation referred to.

Likewise, it should be noted that the drill hole axis 58 is offset from the plane of such recess 72 by approximately a fifty degree angle, but it should also be appreciated that such angle of offset may be between forty-seven and fifty-three degrees. The respective positioning of these elements results in the angular relationship noted in FIG. 8 between the axis of main shafts 34 and paddle members 52, and similarly the angular relationship between paddle members 52 and pin 54 which is mentioned hereandabove. These respective angular relationships produce a more desirable agitation pattern within the batch material contained by the receptacle and similarly tend to move such batch material toward the center portion of the receptacle 52 and toward the axis of each of the respective main shafts 34. Accordingly, even though the mixing means 32 is not primarily intended as a conveying device there is a desire to agitate such material thoroughly and to encourage its movement in the particular directions mentioned. Therefore, as the material moves by gravity through the receptacle 26 and hopper 22 it can also be expected to move from an outer most point within same toward the center thereof.

In certain instances, it has also been found appropriate to reinforce the pin 54 in its exposed axial area between the shaft 34 and the paddle member 52. Accordingly, in the preferred embodiment of the invention a collar 76 is positioned over the shaft 54 in the above-mentioned area. Collar 76 reinforces the pin 54 against forces which may act against pin 54 in its axial direction. Accordingly, stress loading upon the shear means 62 in the axial direction of pin 54 is relieved by the existence of collar 76, thus the shear pin is restricted to forces responsive to loadings only acting in the radial direction relative to the axis of main shafts 34.

It should also be apparent from the various drawing representations and in particular FIGS. 4, 6 and 8 that the paddle members 52 are of a planar configuration and of a diamond shape. Such shape, however, has been modified in that the projected diamond points have been removed to produce flats as at areas 78 and 80. The flats 78 are positioned along the minor axis of the paddle member 52 and those flats identified as reference numeral 80 may be found at the major axis ends of each paddle. Again, it should be noted that the particular paddle shape including these flattened areas 78 and 80 tend to produce a mixing action that induces moisture penetration within the total batch as it is delivered to the receptacle 26.

As has hereinbefore been indicated, a principle objective of this invention is to effectively wet the glass batch immediately prior to its entry into the glass melting furnace so as to minimize dusting within the furnace. Accordingly, the mixing apparatus of this invention incorporates as a part thereof, the above-mentioned fluid system 44 including its spray nozzle delivery means 48, which is adapted to wet the glass batch as it enters receptacle 26 from the batch delivery means 20. This fluid system is responsive to the glass melting furnace level control circuitry which, by appropriate sensor means, controls the operation of the glass furnace charger 12. Such control circuitry initiates and terminates the operation of the driving means for glass furnace charger pusher mechanism 24, which of course, delivers the glass batch directly into the furnace opening 14. Responsive to this control circuitry, which initiates the driving means for pusher element 24, suitable control means and in particular valve 78, is solenoid operated in such fashion to permit fluid flow to the delivery means 48.

This fluid control means, valve 78, is adapted for on-off operation thus promoting a relatively constant fluid flow through the system to the delivery means 48 without any particular variance therein, except as that influenced by fluid source pressure variance. Furthermore, upon the termination of batch delivery to the glass melting furnace the same sensing system, through the solenoid valve, discontinues fluid flow to the batch residue within receptacle 26. Accordingly, even though batch within the receptacle 26 is being agitated constantly, responsive to the operation of driving means 36, 38, 40, fluid is not delivered to that batch except in those instances where active feeding from the charger hopper 22 is initiated responsive to the needs of glass melting furnace 10. Likewise, because of the valving mechanism employed, the fluid flow within such system is adapted to the relatively constant and may be appropriately set in accordance with the desires of the user.

It is anticipated that a water content of between $1\frac{1}{4}$ and $2\frac{1}{2}$ percent based upon glass batch weight is desirable to effect the desired results concerning the minimization of dusting within the glass melting furnace 10. Similarly, it is considered that the ideal percentage moisture content is about between $1\frac{1}{2}$ and 2 percent, but for any particular installation, it is best that such be determined by batch carryover tests and fuel efficiency determinations, as well as dusting conditions.

Figure 11:
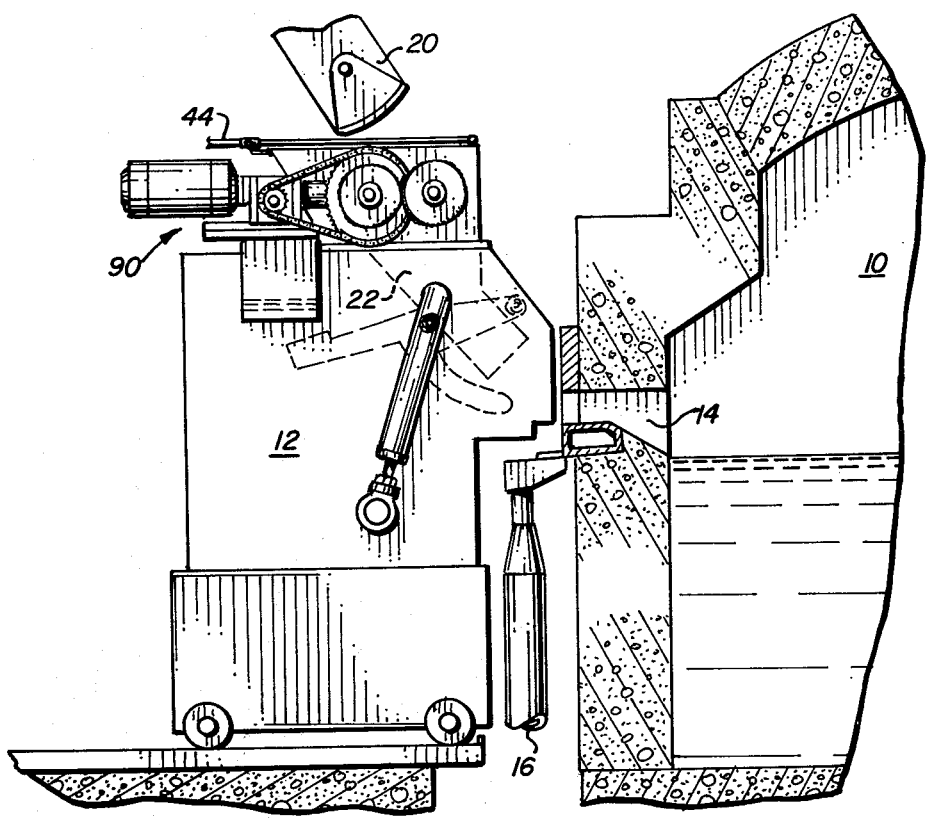
FIG. 11 is a side elevational view partly in cross-section showing a typical glass melting furnace and furnace charger, as shown in FIG. 1, and incorporating an alternate embodiment of a mixing apparatus constructed in accordance with the teachings of the instant invention.

Turning now to FIG. 11, there is seen an alternate embodiment of a glass batch mixing apparatus constructed in accordance with the teachings of the present invention and generally designated by the reference character 90. Glass batch mixing apparatus 90 is positioned atop the glass furnace charger 12 and immediately adjacent batch delivery means 20 and becomes an extension of hopper 22 for delivery of the batch to glass melting furnace 10, as set forth in connection with the previously described embodiment of the glass batch mixing apparatus generally designated 18.

Figure 12:
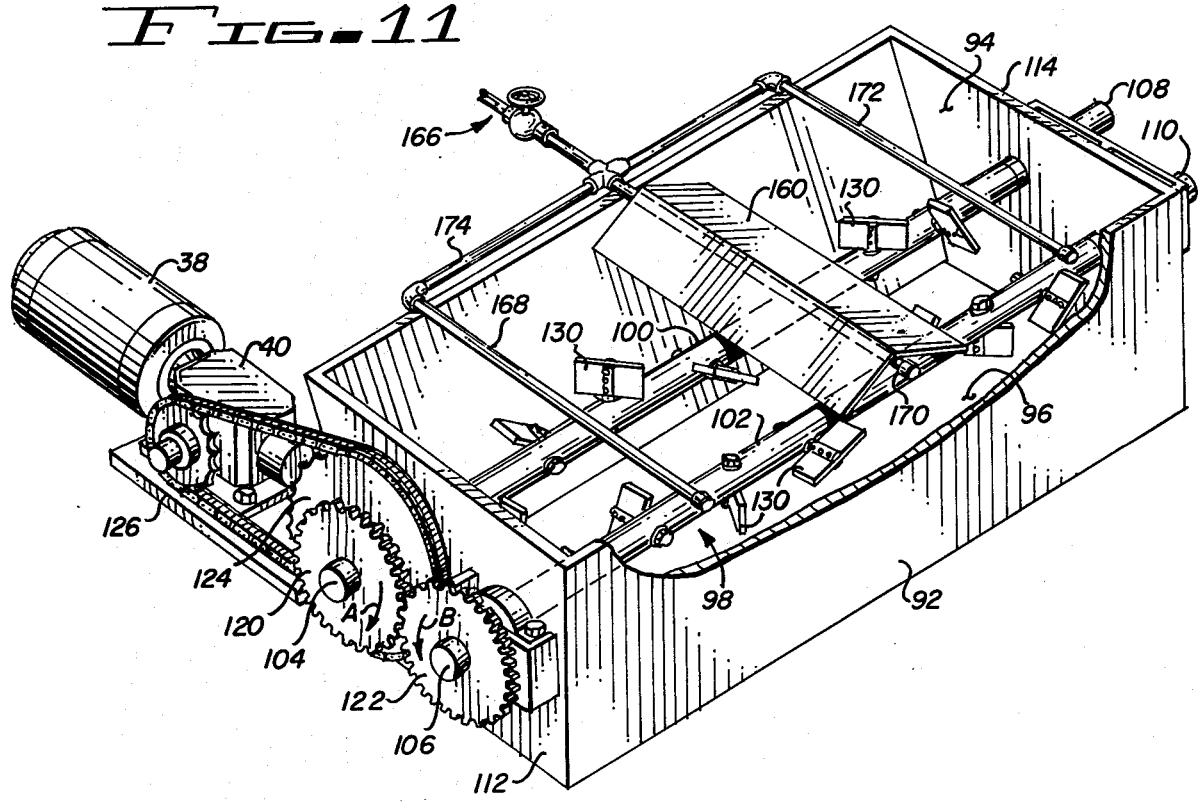
FIG. 12 is a top perspective view showing the mixing apparatus of FIG. 11.
Figure 13:
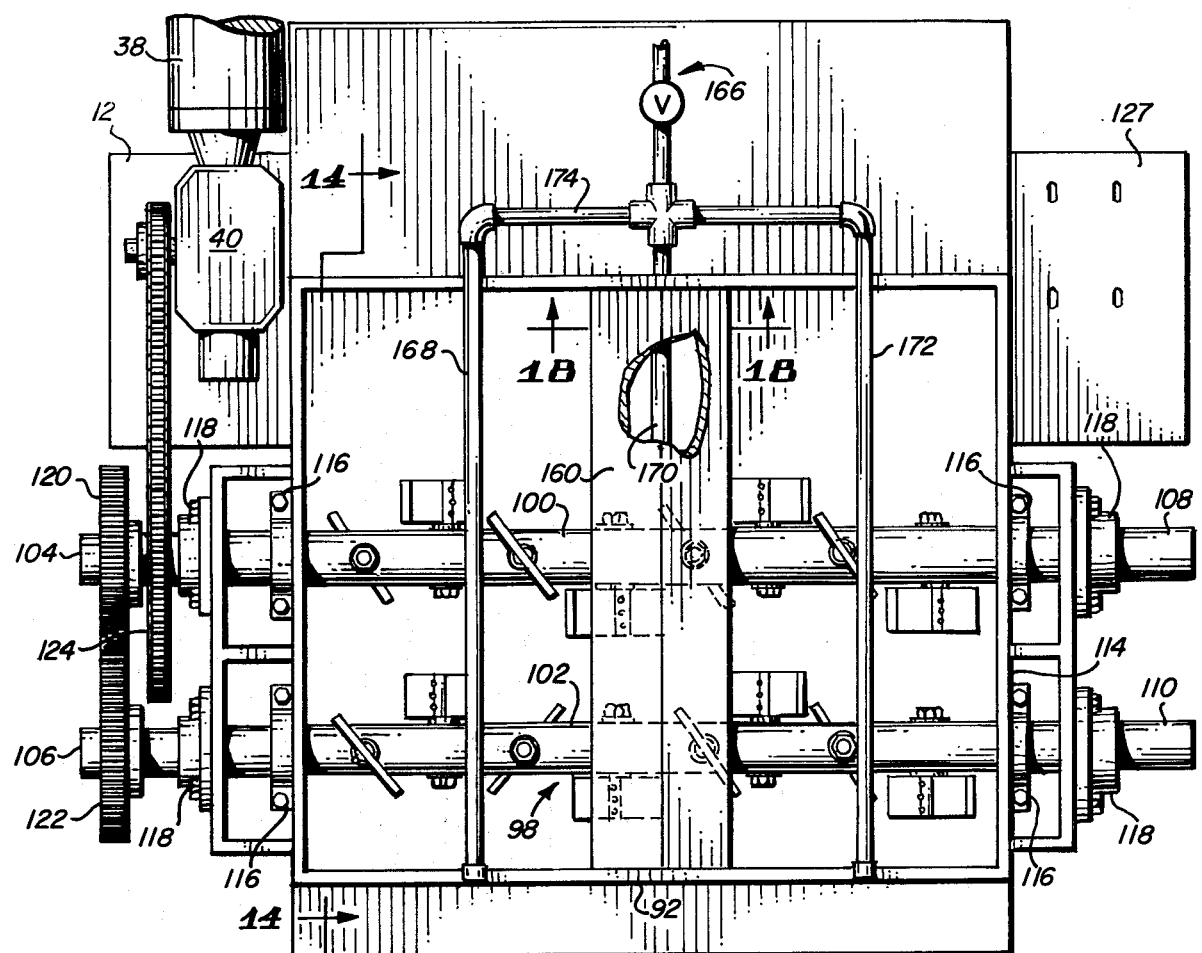
FIG. 13 is a plan view of the furnace charger and mixing apparatus of FIG. 11.
Figure 14:
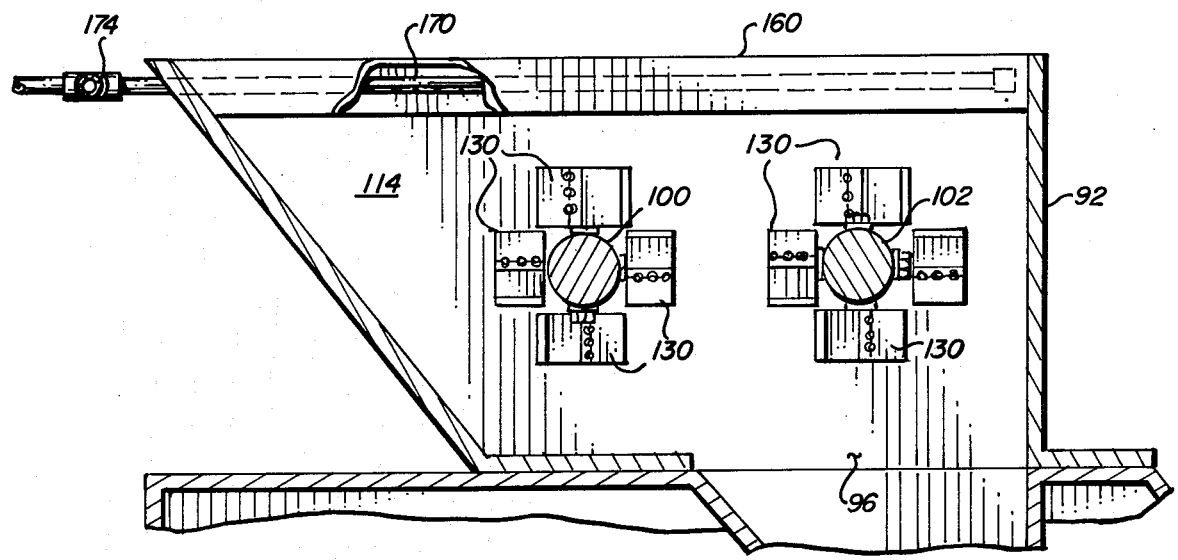
FIG. 14 is a vertical sectional view taken along the line 14—14 of FIG. 13.

Referring more specifically to FIGS. 12, 13 and 14 it is seen that glass batch mixing apparatus 90 is composed of a receptacle 92 having a top inlet opening 94 and a bottom outlet opening 96. Outlet opening 96 is of approximately the same size as the inlet opening of furnace charger hopper 22 and inlet opening 94 is aligned with batch delivery means 20. Accordingly, glass batch mixing apparatus 90 effectively becomes an enlargement of the basic hopper construction 22 of furnace charger 12, as has also previously been described in connection with glass batch mixing apparatus 18.

The receptacle 92 has positioned therein a rotatably mounted mixing means 98 which is comprised of two man rotatable shafts 100 and 102; each having respective first ends 104 and 106 and respective second ends 108 and 110 which extend beyond the lateral sides 112 and 114 respectively of receptacle 92. Shafts 100 and 102 pass through seal means 116 and bearings 118 carried by lateral sides 112 and 114. Persons being skilled in the metalfabrication art have knowledge concerning the proper selection and mounting of seal means 116 and bearings 118. Gear 120 is mounted upon shaft 100 and drivingly engaged therewith by any well known means, such as the use of a key. Gear 122 is similarly mounted upon shaft 102. Shaft 100 is driven through a suitable chain and sprocket assembly 124 which in turn is driven by gear reducer 40 and motor 38 as previously noted. Gears 120 and 122 are of corresponding size and drivingly engaged. It is apparent, therefore, that rotation of gear 120 in the direction of arrow A will urge rotation of gear 122 in the direction of arrow B for synchronous rotation of shafts 100 and 102. It is preferred that the sprocket assembly 124 be of the type that incorporated a slip clutch arrangement. Such arrangement will minimize the possibility of damaging the various driving components in the event of mixer jamming or plugging effecting either one or both of the shafts 110 and 102. End 108 of shaft 100 and end 110 of shaft 102 are sized in accordance with ends 104 and 106 and similarly provided with key ways or other engagement means for receiving gears 120 and 122 respectively.

A pad 126 is provided on either end of receptacle 92 for mounting gear reducer 40 and motor 38. Shafts 100 and 102 can therefore be driven from either end as deemed appropriate by the user.

Each of the rotatably mounted mixing means 98 incorporates upon shafts 100 and 102, agitating means 128, as further seen in FIGS. 14–17, which are comprised of radially protruding paddle members 130 affixed to pins 132. Each of the shafts 100 and 102 are suitably bored as at 134 to accept the pins 132. The outer most end 134 of each pin 132 incorporates a recess 136. The recess 136 extends diametrically through the pin 132 in one direction and is aligned with the axis thereof in the other direction. Recess 136 has a width to receive paddle member 130 which is in the form of a generally recetangular plate. Each paddle member 130 is firmly affixed to the respective pin by a plurality of cap screws 138 which threadably engage pin 132 through holes 140 and pass through holes 142 in paddle member 130.

In accordance with the instant embodiment, each of the pins 132 includes a drilled hole 144 into which a shear pin 146 is pressed in a fashion that leaves extended portions 148 protruding from each side of the pin 132. First and second shaft recesses 150 and 152 respectively extending radially from each bore 134 receives extended pin portions 148. Accordingly, the pin 146 provides for alignment of pin 132 with respect to the shafts 100 and 102 in other of two angular positions. Pin 132 is reinforced by collar 154 as hereinbefore described. Pin 132 is firmly and securely affixed to shafts 100 and 102 by means of lock washer 156 and nut assembly 158. Bores 134 are positioned along and around the shafts 100 and 102 in a symmetrical relationship that provides for a slight overlap of the swept area by paddle members 130 during shaft rotation and at approximately a 90 degree offset with respect to each adjacent bore 134.

Due to the positive synchronization of shafts 100 and 102 as provided by gears 120 and 122, shafts 102 and 100 can be placed closer together than in the previously described embodiment. In addition to the overlap of the area swept by paddle members 130 carried by a given shaft, additional overlap can be had between the opposed paddle members 130 of either shaft. In the event of a jam, each shaft will stop simultaneously thereby preventing the paddle members 130 on one shaft from contacting the paddle members 130 on the other shaft.

A deflection baffle 160 is positioned within receptacle 92 and adapted to redirect glass batch as it is delivered from delivering means 20 to a position above each of the mixing means 98. Deflection baffle 160 extends laterally across receptacle 92 above and substantially perpendicular to the rotatably mounted mixing means 98. Deflection baffle 160 includes first side 162 and second side 164, which extend downwardly from apex 166. Glass batch received against deflection baffle 160 from delivery means 20 is divided into two components, each being directed by respective sides 162 and 164. The paddle members carried by rotatably mounted mixing means 98 are oriented to direct the glass batch toward the longitudinal center of receptacle 92. Therefore, the two components of the glass batch which are divided by sides 162 and 164 are immediately urged together by rotatably mounted mixing means 98.

Fluid delivery system 166 associated with receptacle 92 receives fluid from solenoid valve 78 as illustrated and described in connection with FIG. 9. Elongate spargers 168, 170 and 172 interconnected by manifold 174 extend laterally across receptacle 92. Although not here and specifically illustrated, each sparger has a plurality of openings spaced along the underside thereof for delivering fluid to the glass batch. Sparger 170 is secured to the under surface of deflection baffle 160 proximate apex 166 as by brackets 174 which are spot welded or otherwise secured to the under surface of deflection baffle 160. As better seen in FIG. 19, sparger 170 has a first row of openings which are aligned with opening 176 and a second row of openings which are aligned with opening 178. Preferably the axes of openings 176 and 178 are spaced angularly by approximately 95 to 100 degrees, i.e. 47½ to 50 degrees from vertical. Preferably spargers 168 and 172 have a single row of openings on the underside thereof.

Spargers 168 and 172 provide uniform wetness to the surface of the batch upon its initial entry into the mixer 90 analygous to the wetting action of nozzles 48, as hereinbefore described. Sparger 170 wets the under side of each component of the batch as it is separated over deflection baffle 160. Accordingly, a certain uniformity of wetness throughout the batch is achieved prior to contact with the rotatably mounted mixing means 98.

From the foregoing, it should be apparent that the instant invention provides an improved apparatus that may effectively be employed with and in conjunction with existing glass furnace conveying equipment in such a fashion that the batch delivered therethrough may be effectively wetted and mixed to produce a resultant intermediate having substantially improved characteristics.

Having fully described and disclosed the present invention and the preferred embodiments thereof in such clear and concise terms as to enable those skilled in the art to understand and practice the same, the invention claimed is:

1. A combined glass furnace batch charging and mixing apparatus and comprising an integral hopper and receptacle, said receptacle being positioned atop said hopper and having separate top inlet and bottom outlet openings disposed one above the other, rotatably mounted mixing means positioned within said receptacle and separate feeding means positioned within said hopper, driving means for each said mixing means and feeding means, and a fluid delivery system including fluid delivery means positioned for simultaneous wetting and feeding such that batch upon entry to the receptacle is wetted therefrom, said fluid system including control means that responds in conjunction with movement of said feeding means to discharge fluid through the delivery means and which upon cessation of feeding means movement terminates said flow of fluid.

2. A combined glass furnace batch charging and mixing apparatus according to claim 1 wherein said fluid delivery system includes fluid delivery means positioned adjacent said inlet opening and baffle means such that material upon entry to the receptacle is wetted therefrom.

3. A combined glass furnace batch charging and mixing apparatus according to claim 1 wherein said rotatably mounted mixing means is comprised of at least one main rotatable shaft extending transversely of said receptacle and supporting agitating means therefrom.

4. A combined glass furnace batch charging and mixing apparatus according to claim 3 wherein said agitating means includes a plurality pins protruding radially from said main rotatable shaft with paddle members affixed to the terminal ends thereof and wherein said pins and paddle members are so positioned along the shaft such that there is an overlap of areas swept by said paddle members.

5. The combined glass furnace batch charging and mixing apparatus according to claim 4 wherein each of said paddle members is angularly positioned at between about 47 and 53 degrees respective to the axis of said main rotatable shaft.

6. A combined glass furnace batch charging and mixing apparatus according to claim 4 wherein the pins to which said paddles are affixed are symmetrically positioned around the shaft.

7. A combined glass furnace batch charging and mixing apparatus according to claim 3 wherein the agitation means are positioned axially along said rotatable shaft such that the area swept by each agitation means slightly overlaps that of the agitation means adjacent thereto.

8. A combined glass furnace batch charging and mixing apparatus according to claim 1 wherein said receptacle includes a deflection baffle across said inlet opening.

9. A combined glass furnace batch charging and mixing apparatus according to claim 8 wherein said rotatably mounted mixing means includes two main rotatable shafts extending transversely of said receptacle.

10. A combined glass furnace batch charging and mixing apparatus according to claim 9 wherein said rotatable shafts are on opposite sides of and substantially parallel to said deflection baffle.

11. A combined glass furnace batch charging and mixing apparatus according to claim 9 wherein said deflection baffle extends laterally across said inlet opening substantially perpendicular to said rotatable shafts.

12. A combined glass furnace batch charging and mixing apparatus according to claim 11 wherein said fluid delivery means includes an elongate sparger carried on the underside of said deflection baffle.

* * * * *